United States Patent [19]

Thompson

[11] 3,994,255
[45] Nov. 30, 1976

[54] OPEN-CLOSED INDICATOR FOR A VALVE

[75] Inventor: William Stanley Thompson, Elkhart, Ind.

[73] Assignee: Elkhart Brass Manufacturing Co., Inc., Elkhart, Ind.

[22] Filed: Feb. 3, 1976

[21] Appl. No.: 654,803

[52] U.S. Cl. .............................................. 116/125
[51] Int. Cl.² ......................................... F16K 37/00
[58] Field of Search ............ 116/125; 137/382, 553, 137/556

[56] References Cited
UNITED STATES PATENTS

| | | | |
|---|---|---|---|
| 627,395 | 6/1899 | Crist | 116/125 |
| 684,191 | 10/1901 | Chatham | 137/553 |
| 2,367,651 | 1/1945 | Stone | 116/125 |
| 3,804,056 | 4/1974 | Lee | 116/125 |

*Primary Examiner*—S. Clement Swisher
*Assistant Examiner*—Denis E. Corr
*Attorney, Agent, or Firm*—Oltsch & Knoblock

[57] ABSTRACT

A skirt part is secured for rotation with the stem of a valve, overlying a part of the valve housing. This part of the valve housing carries a rotatable ring which includes a tab. The tab protrudes through a slot in the side of the skirt part. As the stem is rotated to open or close the valve, the skirt part shifts both longitudinally and rotatively relative to the valve housing part to cause the ring to rotate about its valve part with its tab being positioned at various indicative locations within the skirt part slot. In this manner the location of the tab within the skirt part slot provides a visual indication of the operational status of the valve.

4 Claims, 5 Drawing Figures

OPEN-CLOSED INDICATOR FOR A VALVE

SUMMARY OF THE INVENTION

This invention relates to a visual indicator by which the open-closed operational status of a valve can be determined.

In the valve of this invention a flanged member is secured to the valve handle or stem so as to be both rotatable and shiftable longitudinally with the stem relative to the valve housing upon opening and closing movement of the valve. The flanged member spacedly overlies a neck part of the valve housing. A tab carrying member is rotatably secured to the valve neck part with the tab protruding through a slot in the flanged member. As the valve stem is turned, rotation of the flanged member also causes the tab carrying member to rotate with the flanged member shifting relative to the tab. When the valve is closed the tab will be positioned at one location within the slot of the flanged member and when the valve is open the tab will be positioned in another location within the flanged member slot so as to provide a quick means for visually observing the operational status of the valve.

A valve incorporating the indicator of this invention would have application in fire sprinkler and similar systems in which it is necessary for certain valves to remain in an open position for immediate use. By using the open-close indicator of this invention an observer or inspector can readily tell by quick visual observation whether the sprinkler control valve is in its open operational position.

Accordingly, it is an object of this invention to provide an indicator means for a valve which provides for a rapid visual observation as to whether the valve is open or closed.

Another object of this invention is to provide means for visually determining the open-closed operational status of a fire valve.

Still another object of this invention is to provide an open-closed visual indicator means which is for a valve and which is of economical, simplified, reliable operation.

Other objects of this invention will become apparent upon a reading of the invention's description.

BRIEF DESCRIPTION OF THE DRAWINGS

A preferred embodiment of this invention has been chosen for purposes of illustration and description wherein.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
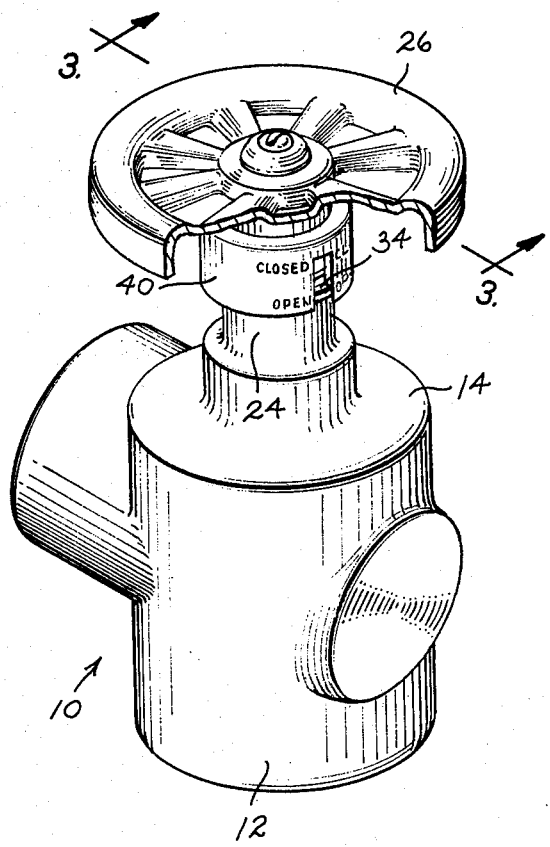
FIG. 1 is a perspective view of a valve having the open-closed indicator of this invention incorporated in it with portions of the valve handle being broken away for purposes of showing the valve in its open position.
Figure 2:
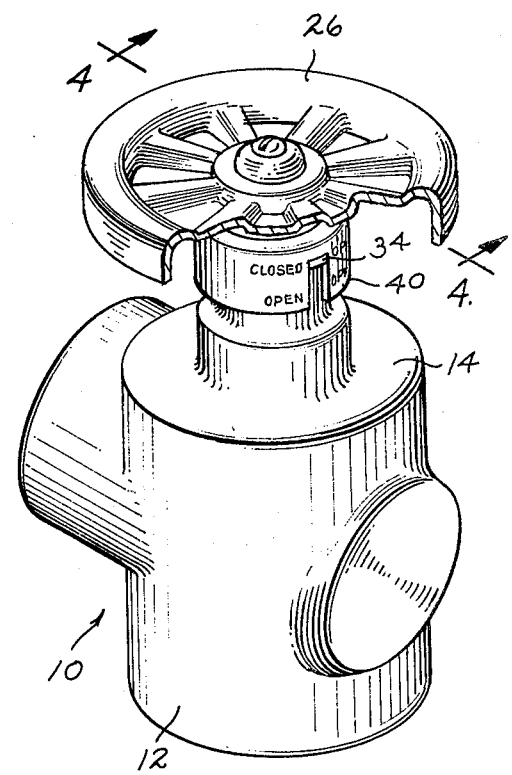
FIG. 2 is a perspective view of the valve of FIG. 1 shown with portions of the valve handle broken away for purposes of illustrating the valve in its closed position.
Figure 5:
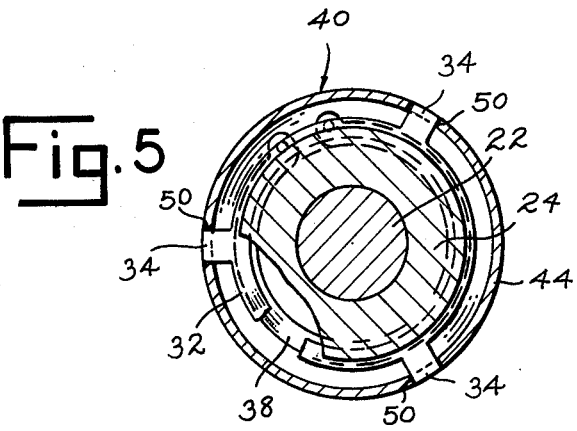
FIG. 5 is a cross sectional view of the valve taken across line 5—5 of FIG. 4.
Figure 3:
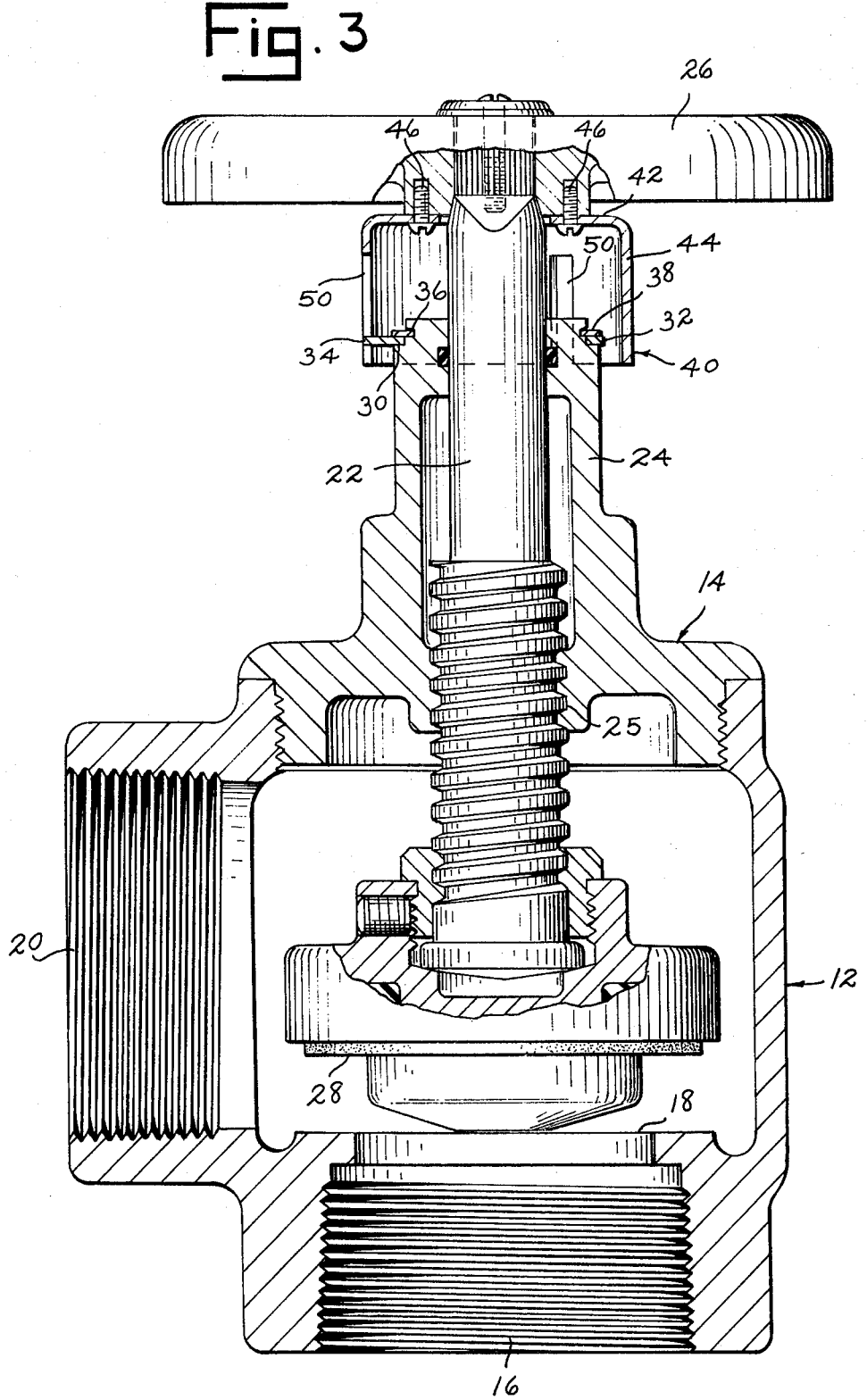
FIG. 3 is a sectional view of the valve taken along line 3—3 of FIG. 1.
Figure 4:
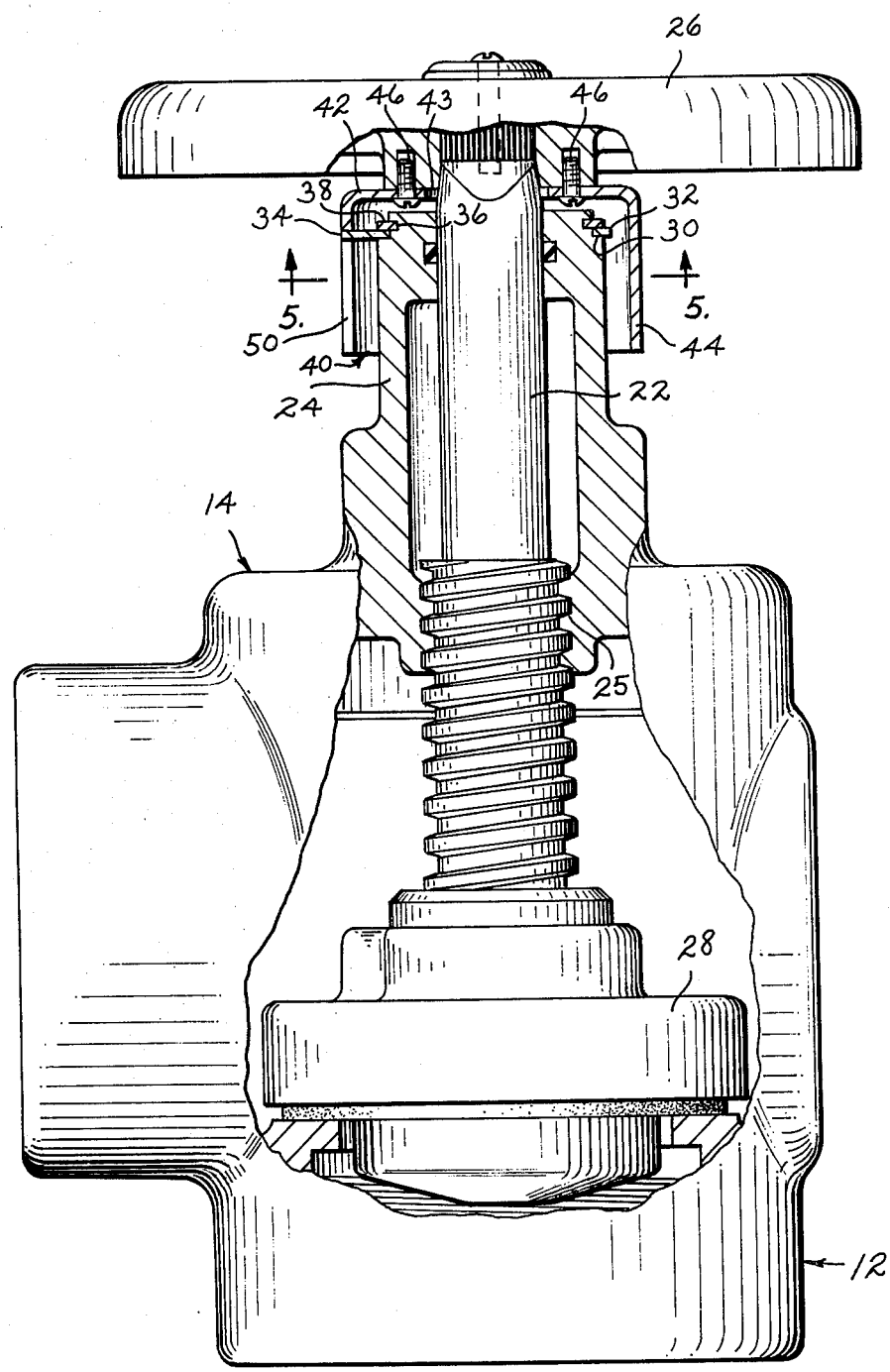
FIG. 4 is a sectional view of the valve taken along line 4—4 of FIG. 2.

Valve 10 includes a housing which consists of a body 12 and a bonnet 14. Valve body 12 includes an inlet 16 which defines a valve seat 18 and an outlet 20. A valve stem 22 extends coaxially through a neck part 24 of bonnet 14 and is threadably engaged at 25 with the bonnet so that upon rotation the stem will shift longitudinally within the valve housing. A valve handle 26 is attached to the exterior end of stem 22 and a valve closure 28 is carried at the inner or opposite end of the stem. Turning of handle 26 causes rotation of the stem 22 and movement of valve closure 28 between a position engaging valve seat 18 to close the valve as shown in FIG. 4, and a position in which the valve closure is spaced from the valve seat with the valve being in an open position.

Neck part 24 of the valve bonnet is formed with a shoulder 30. A ring 32 which includes protruding tabs 34 is fitted about neck part 24 and is generally concentrically positioned relative to the axis of rotation of valve stem 22. Ring 32 is supported upon neck part shoulder 30. An annular groove 36 is formed spacedly above shoulder 30 in neck part 24. A retainer ring 38 is carried within groove 36 and overlies ring 32 to secure the ring upon neck part 24. Ring 32 fits freely upon neck part 24 and between shoulder 30 of the neck part and retainer ring 38 so as to be rotatable about the neck part and the axis of rotation of stem 22.

An indicator part 40 is secured to handle 26 for rotation with stem 22. Part 40 is of a skirt or cup-shaped configuration and includes an end wall 42 and a side wall 44. End wall 42 has a central opening 43 through which stem 22 protrudes. Screws 46 are turned through end wall 42 and into handle 26 to connect part 40 to the handle. Side wall 44 of the indicator part spacedly overlies side 48 of neck part 24 and is provided with longitudinally extending slots 50.

Tabs 34 carried by ring 32 project into slots 50 of indicator part 40. Upon a turning of handle 36 and resulting rotation of stem 22, tabs 34 will be caused to contact the sides of slots 50 and to rotate with the indicator part. Turning of handle 26 also causes stem 22 of the valve to shift longitudinally which in turn causes valve closure 28 to shift relative to valve seat 18. This longitudinal movement of stem 22 causes a similar shiftable movement of indicator part 40, with the result that the indicator part shifts relative to ring 32 which because of its engagement with valve housing shoulder 30 and retainer ring 38 can only rotate. By noticing the relative location of tabs 34 within indicator part slots 50, a visual determination can be made as to whether valve 10 is in its open or closed position. Indicia, indicated by the words "closed" and "open", is placed upon the indicator part at spaced locations adjacent slots 50 corresponding to the locations of tabs 34 when the valve is opened and when the valve is closed.

It is to be understood that the method of securing indicator part 40 to the valve stem or handle may vary from construction to construction of the valve. In some valve constructions the indicator part may be attached directly to the stem, while in other constructions the indicator part may be clamped between the valve handle and stem. Also, the indicator of this invention can be utilized with a pressure reducing valve where the stem need not carry the valve closure. Additionally, it is to be understood that the invention is not to be limited to the precise structural details above given, but it may be modified within the scope of the following appended claims.

What I claim is:

1. In a valve including a housing defining a chamber having inlet and outlet ports and a valve seat therebetween, a stem having outer and inner end portions, said housing having a neck part, said stem extending into said neck part, a valve closure in said chamber and being shiftable by said stem inner end portion toward said valve seat, a handle carried by said stem outer end portion exteriorly of said housing, said stem and housing including cooperating thread means for shifting said stem longitudinally relative to the housing between open and close positions upon turning of said handle, the improvement comprising an indicator means carried by one of said stem and handle for rotation with the stem and handle and longitudinal movement with the stem relative to said housing, said indicator means including a flange portion generally paralleling said stem and having a slot formed therein, said slot generally paralleling said stem and having first and second locations therein, said neck part having a side wall, said flange portion spacedly overlying said neck part side wall in both said first and second positions of the stem, tab means, means securing said tab means to said neck part for rotation about the neck part, said tab means extending into said flange portion slot for contacting said flange portion within said slot and rotating about said neck part as said indicator means rotates with said handle and stem, said flange portion slot defining means for permitting shiftable movement of said flange portion over said tab means with the tab means being located at said first slot location when the stem is in its first position and at said second location when said stem is in its second position.

2. The valve of claim 1 wherein said tab means includes a ring part and protruding tab part, a shoulder formed about said neck part, said ring part supported upon said shoulder, said tab part fitting within said flange portion slot.

3. The valve of claim 1 wherein said indicator means is cup-shaped and includes an end wall and a side wall, said side wall defining said flange portion and encircling said housing neck part.

4. The valve of claim 3 wherein said indicator means side wall has said slot therein, visible indicia means carried by said side wall adjacent said slot for indicating a valve open position at said slot second location and a valve closed position at said slot first location.

* * * * *